United States Patent
Vouras et al.

(10) Patent No.: US 10,054,666 B2
(45) Date of Patent: Aug. 21, 2018

(54) SPARSE SPACE-TIME ADAPTIVE ARRAY ARCHITECTURE

(71) Applicants: Peter Vouras, Bristow, VA (US); Jean De Graaf, Potomac, MD (US)

(72) Inventors: Peter Vouras, Bristow, VA (US); Jean De Graaf, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 378 days.

(21) Appl. No.: 14/867,547

(22) Filed: Sep. 28, 2015

(65) Prior Publication Data

US 2016/0091598 A1 Mar. 31, 2016

Related U.S. Application Data

(60) Provisional application No. 62/055,961, filed on Sep. 26, 2014.

(51) Int. Cl.
*G01S 7/02* (2006.01)
*G01S 7/36* (2006.01)
*G01S 7/28* (2006.01)
*G01S 13/524* (2006.01)

(52) U.S. Cl.
CPC ............ *G01S 7/023* (2013.01); *G01S 7/2813* (2013.01); *G01S 7/36* (2013.01); *G01S 13/5244* (2013.01)

(58) Field of Classification Search
CPC .............................. G01S 7/023; G01S 7/2813
USPC .................................................. 342/16, 159
See application file for complete search history.

(56) References Cited

U.S. PATENT DOCUMENTS

| | | | | |
|---|---|---|---|---|
| 5,173,706 A * | 12/1992 | Urkowitz | ................ | G01S 7/032 342/101 |
| 6,400,306 B1 * | 6/2002 | Nohara | ............... | G01S 13/5244 342/160 |
| 8,717,230 B1 * | 5/2014 | Fischi | ................... | G01S 7/2813 342/159 |
| 8,947,294 B1 * | 2/2015 | Wasiewicz | ............ | G01S 7/2813 342/159 |
| 8,970,426 B1 * | 3/2015 | Stockmann | ......... | G01S 13/5244 342/159 |
| 9,285,469 B1 * | 3/2016 | Schuman | ............ | G01S 13/5248 |
| 9,772,402 B2 * | 9/2017 | Schuman | ............ | G01S 13/5244 |

(Continued)

OTHER PUBLICATIONS

P. Pal and P. P. Vaidyanathan, "Nested Arrays: A Novel Approach to Array Processing With Enhanced Degrees of Freedom," in IEEE Transactions on Signal Processing, vol. 58, No. 8, pp. 4167-4181, Aug. 2010. (Year: 2010).*

(Continued)

*Primary Examiner* — Marcus E Windrich
(74) *Attorney, Agent, or Firm* — U.S. Naval Research Laboratory; William Ladd

(57) ABSTRACT

A sparse multichannel array includes a plurality of array elements, a receiver behind each array element, and a Doppler filter bank behind each receiver, whereby within each Doppler bin is placed spatial nulls at selected angles of undesired interference. The invention enables Doppler processing to be performed on sparse arrays, such as nested or coprime arrays, used in nonlinear adaptive beamforming to mitigate the impact of unintentional interference and hostile jamming on the received signal.

15 Claims, 2 Drawing Sheets

(56) References Cited

U.S. PATENT DOCUMENTS

| | | | | |
|---|---|---|---|---|
| 2003/0117314 A1* | 6/2003 | Yu | ...................... | G01S 13/4463 |
| | | | | 342/162 |
| 2003/0218565 A1* | 11/2003 | Budic | ..................... | G01S 7/023 |
| | | | | 342/90 |
| 2006/0140291 A1* | 6/2006 | Thomas, Jr. | .......... | H04L 27/265 |
| | | | | 375/260 |
| 2012/0249361 A1* | 10/2012 | Sahinoglu | ............... | G01S 7/292 |
| | | | | 342/159 |

OTHER PUBLICATIONS

Si Qin, Yimin D. Zhang and Moeness G. Amin, Generalized Coprime Array Configurations for Direction-of-Arrival Estimation, IEEE Transactions on Signal Processing, vol. 63, No. 6 pp. 1377-1390 (Mar. 2015).

Piya Pal and P. P. Vaidyanathan, "Nested Arrays: A Novel Approach to Array Processing With Enhanced Degrees of Freedom", IEEE Transactions on Signal Processing, vol. 58, No. 8 pp. 4167-4181 (August 2010).

Piya Pal and P. P. Vaidyanathan, "Nested Arrays in Two Dimensions, Part I: Geometrical Considerations", IEEE Transactions on Signal Processing, vol. 60, No. 9 pp. 4694-4705 (Sep. 2012).

Piya Pal and P. P. Vaidyanathan, "Nested Arrays in Two Dimensions, Part II: Application in Two Dimensional Array Processing", IEEE Transactions on Signal Processing, vol. 60, No. 9 pp. 4706-4718 (Sep. 2012).

* cited by examiner

SPARSE SPACE-TIME ADAPTIVE ARRAY ARCHITECTURE

CROSS-REFERENCE TO RELATED APPLICATIONS

This Application claims the benefit of U.S. Provisional Application 62/055,961, filed on Sep. 26, 2014 and incorporated herein by reference.

FIELD OF THE INVENTION

The invention is directed to a space-time adaptive (STAP) array architecture having a sparse multichannel receiver array, and more particularly to such an array incorporating a Doppler filter bank behind each array element.

BACKGROUND OF THE INVENTION

Adaptive beamforming is a powerful technique used in modern radars to mitigate the impact of unintentional interference and hostile jamming. Typically, nulls are created in the receive pattern of an array by applying a complex weight to each array element. Using conventional linear processing, an array of N physical elements can form no more than N−1 adaptive nulls. To overcome this limitation, nonlinear techniques have been developed capable of forming O(N2) nulls in an array pattern. A drawback to nonlinear adaptive processing is that any Doppler information in the received signal is lost.

To provide a brief overview of nonlinear adaptive processing consider an N element nonuniform linear array (NULA). Assume M narrowband signals are arriving at this array from directions $0_1, 0_2, \ldots, 0_M$ with powers $\sigma_1^2, \sigma_2^2, \ldots, \sigma_M^2$, respectively. Let v(0) be the N-by-1 steering vector corresponding to the direction 0, $$v(0) = [1 \, e^{j(2\pi/\lambda)d_1 \sin 0} \ldots e^{j(2\pi/\lambda)d_N 1 \sin 0}]^T \quad (1)$$

where $d_1$ denotes the position of the ith sensor. The received signal at time instant k is $$x[k] = A(0)s(k) + n[k] \quad (2)$$

where $A(0) = [v(0_1) \, v(0_2) \ldots v(0_M)]$ is the array manifold matrix and $s[k] = [s_1[k] \, s_2[k] \ldots s_m[k]]^T$ is a vector of samples from uncorrelated signal sources. The noise n[k] is assumed to be temporally uncorrelated so that the signal covariance matrix $R_{ss}$ is diagonal. Now the covariance matrix of the received signal becomes $$R_{zz} = E[xx^H] = A(0)R_{ss}A(0)^H + \sigma_n^2 I \quad (3)$$

$$= A(0)\begin{bmatrix} \sigma_1^2 & 0 & \ldots & 0 \\ 0 & \sigma_2^2 & \ddots & \vdots \\ \vdots & \ddots & \ddots & 0 \\ 0 & \ldots & 0 & \sigma_M^2 \end{bmatrix} A(0)^H + \sigma_n^2 I. \quad (4)$$

Next, the covariance matrix $R_{ss}$ is vectorized to create the vector $$z(0) = vcc(R_{zz}) = vcc\left[\sum_{i=1}^{M} \sigma_i^2 (v(\theta_i)v(\theta_i)^H)\right] + \sigma_n^2 1_n \quad (5)$$

$$= (A(0)^* \odot A(0))p + \sigma_n^2 1_n \quad (6)$$

where * denotes conjugation. $p = [\sigma_1^2 \, \sigma_2^2 \ldots \sigma_M^2]^T$ and $1_n = [e_1^T \, e_2^T \ldots e_N^T]^T$ with $e_i$ a column vector of all zeros except for a one in the ith position. The matrix $$A(0)^* : A(0) = [v(0_1)^* \odot v(0_1) \ldots v(0_M)^* \odot v(0_M)] \quad (7)$$

is the Khatri-Rao product of the matrices A(0)* and A(0) with $\odot$ denoting the Kronecker product. In conventional nonlinear adaptive processing. the adapted beampattern is formed by applying a weight vector w to the vector z(0): as in $w^H z(0)$. [1]-[3].

A drawback to nonlinear adaptive processing is that any Doppler information in the received signal is lost.

BRIEF SUMMARY OF THE INVENTION

According to the invention, a sparse multichannel array includes a plurality of array elements, a receiver behind each array element, and a Doppler filter bank behind each receiver, whereby within each Doppler bin is placed spatial nulls at selected angles of undesired interference.

The purpose of this invention is to exploit the extra spatial degrees of freedom inherent in nonlinear adaptive processing while also retaining the Doppler information in the received signal. The invention incorporates a Doppler filter bank behind each element of a sparse multichannel array and within each Doppler bin places spatial nulls at the angles of undesired interference.

The invention exploits the extra spatial degrees of freedom inherent in nonlinear adaptive processing while also retaining the Doppler information in the received signal. The invention enables Doppler processing to be performed on sparse arrays, such as nested or coprime arrays, used in nonlinear adaptive beamforming to mitigate the impact of unintentional interference and hostile jamming on the received signal. The invention has applications to Synthetic Aperture Radars (SARs) deployed on Unmanned Aerial Vehicles (UAVs) with severe form factor constraints. Other applications include conventional, legacy radars operating in dense interference environments, and passive sonar systems operating in littoral environments.

DETAILED DESCRIPTION OF THE INVENTION

Figure 1:
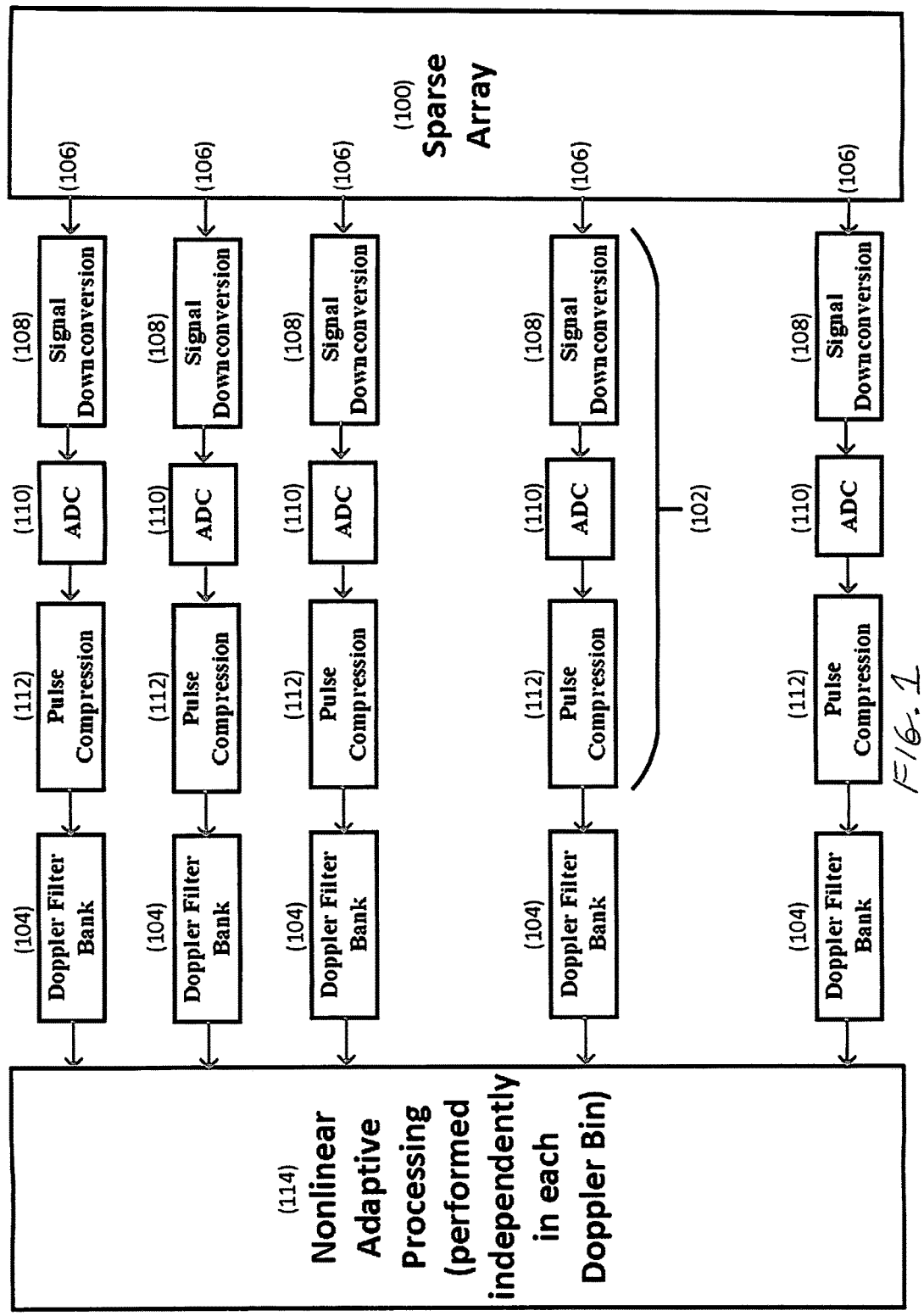
FIG. 1 is a schematic illustration of a multichannel sparse array with a receiver and a Doppler filter bank behind each array element according to the invention.

The invention is illustrated in FIG. 1. It consists of a multichannel sparse array 100 with a receiver 102 and a Doppler filter bank 104 behind each array element 106. Every receiver 102 performs signal downconversion to baseband with downconverter 108, then analog-to-digital conversion with ADC 110, and pulse compression with pulse compressor 112. Each Doppler filter bank 104 transforms the uniformly sampled radar pulses from a single range bin to the Doppler domain. The signal processor 114 then performs nonlinear spatially adaptive processing within each Doppler frequency bin.

To describe the operation of this array architecture consider the discrete-time voltage output vector $x_n(m,0)$ of a sparse (e.g.. nested or coprime) array in the absence of noise.

$$x_n(m,0)=s_n[m]v(0) \quad (8)$$

where m denotes pulse number. n corresponds to the range bin. $s_n(m)$ represents complex baseband samples of the signal. and $v(0)$ is the steering vector in the direction 0 of a single target. For a fixed range bin n, the Discrete Fourier Transform of $x_n(m, 0)$ over K pulses yields the Doppler spectrum $$x_n(f_k, 0)=s_n(f_k)v(0) \quad (9)$$

for $k=0,1,\ldots,K-1$. Taking the Kronecker product of $x_n(f_k, 0)$ in each Doppler bin yields $$z_k(0)=x_n(f_k,0)^* \odot x_n(f_k,0)=|s_n(f_k)|^2(v(0)^* \odot v(0)). \quad (10)$$

After computing an adaptive weight vector $w_k$ using any one of a variety of techniques [5]. the spatially adapted pattern in the kth Doppler bin can now be written as $$b(f_k, 0)=w_k^H z_k(0). \ k=0,1,\ldots,K-1 \quad (11)$$

Notice that the spatial response and the Doppler response of the array are adapted independently. The composite array response $b(0)$ at the nth range bin is formed by summing across all the Doppler filters.

$$b(0) = \sum_{k=0}^{K-1} w_k^H z_k(0). \quad (12)$$

For the case with L different targets and noise.

$$x_n(m,0) = [v(0_1) \ v(0_2) \ \ldots \ v(0_L)] \begin{bmatrix} s_{1n}[m] \\ s_{2n}[m] \\ \vdots \\ s_{Ln}[m] \end{bmatrix} + \begin{bmatrix} n_{1n}[m] \\ n_{2n}[m] \\ \vdots \\ n_{Nn}[m] \end{bmatrix} \quad (13)$$

$$= A(0)s_n[m] + n_n[m]. \quad (14)$$

For a fixed range bin n, the Discrete Fourier Transform of $x_n(m,0)$ over K pulses yields $$x_n(f_k, 0)=A(0)s_n(f_k)+n_n(f_k) \quad (15)$$

for $k=0,1,\ldots,K-1$. The vector $z_k(0)$ is now $$z_k(0) = vec(E[x_n(f_k,0)x_n(f_k,0)^H]) \quad (16)$$

$$= (A(0)^* \odot A(0))p + \sigma_n^2 1_n \quad (17)$$

where $p=[|s_{1n}(f_k)|^2 \ |s_{2n}(f_k)|^2 \ \ldots \ |s_{Ln}(f_k)|^2]^T$. After computing an adaptive weight vector $w_k$, the spatially adapted pattern $b(f_k, 0)$ in the kth Doppler bin is given by (11) and the composite array output $b(0)$ is computed as in (12).

Figure 2:
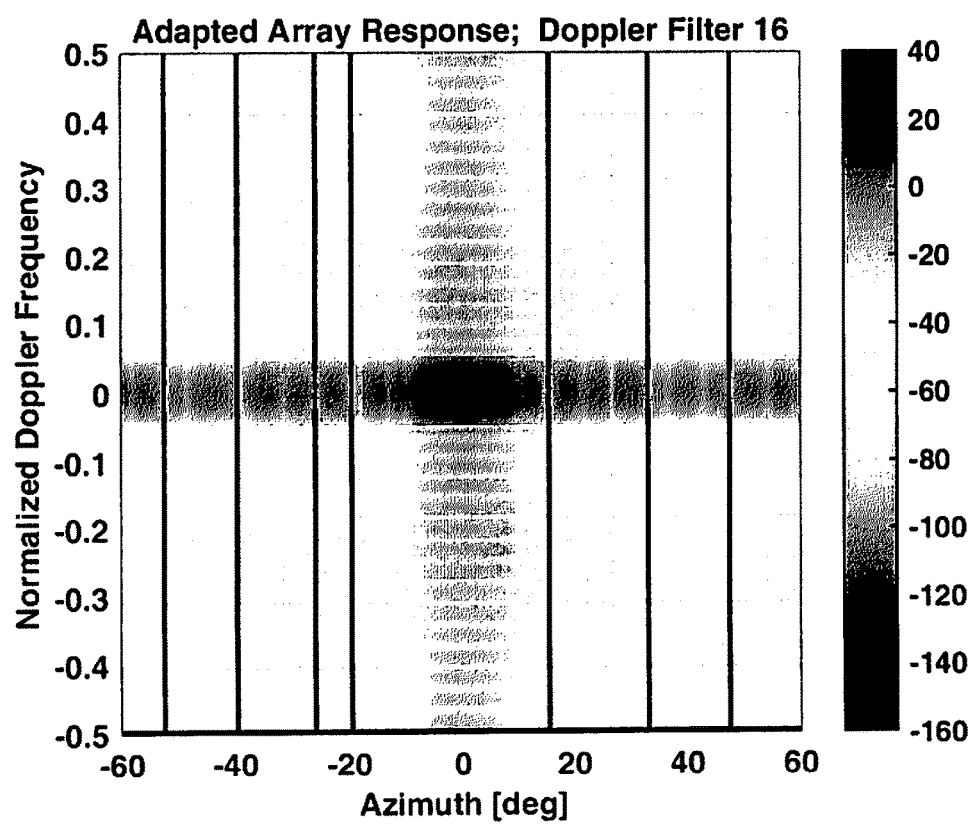
FIG. 2 is the adapted angle-doppler response in the 16th Doppler filter (of 32) in a nested array architecture with 6 array elements located at the positions {0,1,2,3,7,11} according to the invention.

FIG. 2 illustrates the adapted angle-doppler response in the 16th Doppler filter (of 32) in a nested array architecture with 6 array elements located at the positions $\{0,1,2,3,7,11\}$. There are 7 specified spatial nulls at $-52.8°$, $-40°$, $-26.4°$, $-20°$, $-15.2°$, $-32.8°$, and $47.2°$ with the mainbeam at $0°$. Note that by using linear adaptive beamforming techniques on an array of 6 elements, no more than 5 nulls can be created.

Obviously many modifications and variations of the present invention are possible in the light of the above teachings.

It is therefore to be understood that the scope of the invention should be determined by referring to the following appended claims.

What is claimed as new and desired to be protected by Letters Patent of the United States is:

1. A sparse multichannel array, comprising:
   a plurality of array elements;
   a plurality of receivers, wherein each receiver in the plurality of receivers is behind a respective array element in the plurality of array elements;
   a Doppler filter bank behind each receiver in the plurality of receivers, wherein respective Doppler bins of the Doppler filter bank have spatial nulls placed at selected angles of undesired interference; and
   a signal processor coupled to respective outputs of the Doppler filter bank, wherein the signal processor is configured to perform nonlinear processing for each Doppler bin.

2. The array of claim 1, wherein the array is selected from nested or co-prime.

3. A sparse multichannel array, comprising:
   a plurality of array elements;
   a plurality of receivers, wherein each receiver in the plurality of receivers is behind a respective array element in the plurality of array elements;
   a Doppler filter bank behind each receiver in the plurality of receivers, wherein respective Doppler bins of the Doppler filter bank have spatial nulls placed at selected angles of undesired interference; and
   a signal processor coupled to respective outputs of the Doppler filter bank, wherein the signal processor is configured to:
     perform nonlinear processing for each Doppler bin, and
     determine respective adaptive outputs independently for each Doppler bin.

4. The array of claim 3, wherein the array is selected from nested or co-prime.

5. The sparse multichannel array of claim 1, wherein each receiver in the plurality of receivers comprises:
   a downconverter configured to downconvert a signal to baseband; and
   an analog-to-digital converter (ADC); and
   a pulse compressor.

6. The sparse multichannel array of claim 3, wherein each receiver in the plurality of receivers comprises:
   a downconverter configured to downconvert a signal to baseband; and
   an analog-to-digital converter (ADC); and
   a pulse compressor.

7. The sparse multichannel array of claim 1, wherein the spatial nulls are created in the Doppler filter bank by applying a weight to each array element in the plurality of array elements.

8. The sparse multichannel array of claim 3, wherein the signal processor is further configured to:
   determine a steering vector based on the determined respective adaptive outputs.

9. The sparse multichannel array of claim 3, wherein the signal processor is configured to perform nonlinear spatially adaptive processing within each Doppler frequency bin.

10. A sparse multichannel array, comprising:
    a plurality of array elements;
    a plurality of receivers, wherein each receiver in the plurality of receivers is behind each a respective array element in the plurality of array elements;
    a Doppler filter bank behind each receiver in the plurality of receivers, wherein respective Doppler bins of the Doppler filter bank have spatial nulls placed at selected angles of undesired interference; and a signal processor coupled to respective outputs of the Doppler filter bank, wherein the signal processor is configured to:

determine respective Kronecker products for each Doppler bin, retain distinct elements of the Kronecker products, and determine a steering vector based on the retained distinct elements.

11. The sparse multichannel array of claim 10, wherein the steering vector is a steering vector of a difference co-array of a last Doppler bin of the respective Doppler bins.

12. The sparse multichannel array of claim 10, wherein the signal processor is further configured to compute an adaptive weight vector.

13. The sparse multichannel array of claim 12, wherein the signal processor is further configured to determine a spatially adapted pattern in the last Doppler bin based on the adaptive weight vector.

14. The sparse multichannel array of claim 12, wherein the spatial nulls are created in the Doppler filter bank by applying, based on the adaptive weight vector, a weight to each array element in the plurality of array elements.

15. The sparse multichannel array of claim 10, wherein each receiver in the plurality of receivers comprises:

a downconverter configured to downconvert a signal to baseband; and an analog-to-digital converter (ADC); and a pulse compressor.

* * * * *